(12) United States Patent
Bhagwagar et al.

(10) Patent No.: US 9,752,007 B2
(45) Date of Patent: Sep. 5, 2017

(54) THERMALLY CONDUCTIVE CONDENSATION REACTION CURABLE POLYORGANOSILOXANE COMPOSITION AND METHODS FOR THE PREPARATION AND USE OF THE COMPOSITION

(71) Applicant: DOW CORNING CORPORATION, Midland, MI (US)

(72) Inventors: Dorab Edul Bhagwagar, Saginaw, MI (US); Jeffrey Krzywosinski, Hemlock, MI (US); Kai Su, Midland, MI (US)

(73) Assignee: DOW CORNING CORPORATION, Midland, MI (US)

( * ) Notice: Subject to any disclaimer, the term of this patent is extended or adjusted under 35 U.S.C. 154(b) by 183 days.

(21) Appl. No.: 14/418,464

(22) PCT Filed: May 31, 2013

(86) PCT No.: PCT/US2013/043586
§ 371 (c)(1),
(2) Date: Jan. 30, 2015

(87) PCT Pub. No.: WO2014/021980
PCT Pub. Date: Feb. 6, 2014

(65) Prior Publication Data
US 2015/0183951 A1    Jul. 2, 2015

Related U.S. Application Data

(60) Provisional application No. 61/677,173, filed on Jul. 30, 2012.

(51) Int. Cl.
| | |
|---|---|
| C08L 83/14 | (2006.01) |
| C08G 77/14 | (2006.01) |
| C08G 77/50 | (2006.01) |
| C08K 3/22 | (2006.01) |
| C09J 183/14 | (2006.01) |

(52) U.S. Cl.
CPC ............... *C08K 3/22* (2013.01); *C08L 83/14* (2013.01); *C09J 183/14* (2013.01); *C08G 77/14* (2013.01); *C08G 77/50* (2013.01); *C08K 2003/2227* (2013.01); *C08K 2201/001* (2013.01)

(58) Field of Classification Search
CPC .................................. C08G 77/50; C08G 77/14
See application file for complete search history.

(56) References Cited

U.S. PATENT DOCUMENTS

| | | | |
|---|---|---|---|
| 4,364,991 A | 12/1982 | Byrd et al. | |
| 4,772,675 A * | 9/1988 | Klosowski | C08K 5/5415 528/15 |
| 4,962,076 A * | 10/1990 | Chu | C08K 5/37 502/158 |
| 5,096,963 A | 3/1992 | Blain | |
| 5,145,907 A * | 9/1992 | Kalinowski | C08L 83/04 524/588 |
| 5,340,899 A * | 8/1994 | Altes | C08G 77/50 524/731 |
| 5,376,503 A | 12/1994 | Audett et al. | |
| 5,504,174 A | 4/1996 | Onishi | |
| 5,569,684 A | 10/1996 | Okami et al. | |
| 5,667,884 A | 9/1997 | Bolger | |
| 5,679,463 A | 10/1997 | Visser et al. | |
| 5,888,645 A | 3/1999 | Lindgaard et al. | |
| 5,895,711 A | 4/1999 | Yamaki et al. | |
| 5,910,272 A | 6/1999 | Kushibiki et al. | |
| 5,935,712 A | 8/1999 | Tan et al. | |
| 6,069,201 A | 5/2000 | Okinoshima et al. | |
| 6,153,337 A | 11/2000 | Carlson et al. | |
| 6,224,978 B1 | 5/2001 | Chen et al. | |
| 6,306,957 B1 * | 10/2001 | Nakano | C08L 83/04 524/700 |
| 6,380,301 B1 | 4/2002 | Enami et al. | |
| 6,468,829 B2 * | 10/2002 | Guha | H01L 31/075 438/96 |
| 6,784,555 B2 | 8/2004 | Watson | |
| 7,329,706 B2 | 2/2008 | Fukui et al. | |
| 7,754,829 B2 * | 7/2010 | Kimura | C08L 83/14 524/588 |

(Continued)

FOREIGN PATENT DOCUMENTS

| | | |
|---|---|---|
| EP | 0664322 A1 | 1/1995 |
| EP | 1104787 A2 | 6/2001 |

(Continued)

OTHER PUBLICATIONS

PCT/US2013/043586 International Search Report dated Sep. 27, 2013, 4 pages.
English language abstract for JPH01-165411 extracted from http://www4.ipdl.inpit.go.jp/ database on Jan. 23, 2015, 1 page.
English language abstract and machine assisted English translation for JPH09-111124 extracted from http://www4.ipdl.inpit.go.jp/ database on Jan. 23, 2015, 14 pages.
English language abstract for WO2010041708A1 extracted from espacenet.com on Jan. 23, 2015, 1 page.
English language abstract and machine assisted English language translation for JP2011256214A extracted from http://www4.ipdl.inpit.go.jp/ database on Jan. 23, 2015, 6 pages.
English language abstract for EP1825714A1 extracted from espacenet.com on Jan. 23, 2015, 2 pages.
English language abstract and machine assisted English language translation for JP2013221135 (A) extracted from http://worldwide.espacenet.com database on May 16, 2017, 32 pages.

*Primary Examiner* — Brieann R Fink
(74) *Attorney, Agent, or Firm* — Warner Norcross & Judd LLP

(57) ABSTRACT

A composition comprises (A) a condensation reaction catalyst, (B) a polyorganosiloxane having an average, per molecule, of at least two hydrolyzable substituents, (C) a crosslinker, and (D) a thermally conductive filler. The polyorganosiloxane may be silanol terminated, and the crosslinker may be an alkoxysilylhydrocarbylene functional polyorganosiloxane. The composition is capable of reacting via condensation reaction to form a thermally conductive product. The composition and product are useful for thermal management in (opto)electronics applications.

18 Claims, No Drawings

(56) References Cited

U.S. PATENT DOCUMENTS

| | | |
|---|---|---|
| 2002/0010245 A1 | 1/2002 | Enami et al. |
| 2002/0143100 A1 | 10/2002 | Morimoto et al. |
| 2003/0164223 A1 | 9/2003 | Cross et al. |
| 2004/0002571 A1 | 1/2004 | Sakamoto et al. |
| 2004/0043229 A1 | 3/2004 | Aoki et al. |
| 2004/0116264 A1 | 6/2004 | Chen et al. |
| 2005/0084691 A1 | 4/2005 | Endo et al. |
| 2006/0079634 A1* | 4/2006 | Horikoshi ............... C08L 83/14 524/588 |
| 2006/0093715 A1 | 5/2006 | Weidinger |
| 2006/0135687 A1 | 6/2006 | Fukui |
| 2006/0157462 A1 | 7/2006 | Weiss et al. |
| 2007/0173595 A1 | 7/2007 | Tsuji et al. |
| 2008/0057325 A1 | 3/2008 | Sakurai et al. |
| 2008/0096030 A1 | 4/2008 | Horikoshi et al. |
| 2008/0300358 A1 | 12/2008 | Cook et al. |
| 2009/0229648 A1 | 9/2009 | Makansi |
| 2009/0230348 A1 | 9/2009 | Fukui |
| 2009/0253846 A1 | 10/2009 | Fukui |
| 2009/0291238 A1 | 11/2009 | Scott et al. |
| 2009/0306263 A1 | 12/2009 | Taguchi et al. |
| 2010/0056671 A1 | 3/2010 | Dershem |
| 2010/0143421 A1* | 6/2010 | Van Reeth ............... C08J 3/241 424/401 |
| 2012/0145321 A1 | 6/2012 | Stapleton et al. |

FOREIGN PATENT DOCUMENTS

| | | |
|---|---|---|
| EP | 1162239 A2 | 12/2001 |
| EP | 1227133 A1 | 7/2002 |
| EP | 1825714 A1 | 8/2007 |
| JP | H01-165411 A | 6/1989 |
| JP | H09-111124 A | 4/1997 |
| JP | 200435631 A | 2/2004 |
| JP | 2011256214 A | 12/2011 |
| JP | 2013221135 A | 10/2013 |
| WO | WO8906245 A1 | 7/1989 |
| WO | WO8907623 A1 | 8/1989 |
| WO | WO9211322 A2 | 7/1992 |
| WO | WO9416539 A1 | 7/1994 |
| WO | WO9424704 A1 | 10/1994 |
| WO | WO9629367 A1 | 9/1996 |
| WO | WO9933125 A1 | 7/1999 |
| WO | WO03025080 A1 | 3/2003 |
| WO | WO2007137074 A2 | 11/2007 |
| WO | WO2008045395 A2 | 4/2008 |
| WO | WO2008045446 A2 | 4/2008 |
| WO | WO2008128209 A1 | 10/2008 |
| WO | WO2010041708 A1 | 4/2010 |

* cited by examiner

THERMALLY CONDUCTIVE CONDENSATION REACTION CURABLE POLYORGANOSILOXANE COMPOSITION AND METHODS FOR THE PREPARATION AND USE OF THE COMPOSITION

CROSS-REFERENCE TO RELATED APPLICATIONS

This application is the National Stage of International Patent Application No. PCT/US2013/043586, filed on May 31, 2013, which claims priority to and all advantages of U.S. Patent Application No. 61/677,173, filed on Jul. 30, 2012, the content of which is hereby incorporated by reference.

Thermally conductive, hydrosilylation curable polyorganosiloxane compositions and reaction products thereof are known for use in thermal management in (opto)electronic applications, such as for thermal interface materials and die attach adhesive. However, hydrosilylation requires high temperatures to cure and/or develop adhesion. And, some substrates can inhibit hydrosilylation cure.

A condensation reaction cure system has been widely used for silicone sealants in the construction industry due the low cost of the raw materials. A typical system contains a silanol terminated silicone and alkoxy based crosslinker, such as MeSi(OMe)3, and tin catalyst. This system may provide an advantage over other cure systems because the catalyst is less costly and the curing process does not require the diffusion of moisture into the bulk of the materials, therefore uniform cure throughout the bulk of the reaction product can be obtained. However, we found a disadvantage of this system includes potential reversion reaction when the reaction product is in an enclosed condition. We desire a condensation reaction curable composition with minimal reversion for thermal management in (opto)electronic applications.

SUMMARY

A composition comprises (A) a condensation reaction catalyst, (B) a polyorganosiloxane having an average, per molecule, of at least two hydrolyzable substituents, (C) a crosslinker, and (D) a thermally conductive filler. The composition is capable of reacting via condensation reaction to form a thermally conductive product. The composition and product are useful for thermal management in (opto)electronics applications.

DETAILED DESCRIPTION

All amounts, ratios, and percentages are by weight unless otherwise indicated. The wt % of all ingredients in a composition total 100 wt %. The articles 'a', 'an', and 'the' each refer to one or more, unless otherwise indicated by the context of specification. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an aryl group, or an aralkyl group includes the member alkyl individually; the subgroup alkyl and aryl; and any other individual member and subgroup subsumed therein.

"Alkyl" refers to an acyclic, branched or unbranched, saturated monovalent hydrocarbon group. Alkyl is exemplified by, but not limited to, methyl, ethyl, propyl (e.g., isopropyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl.

"Aryl" refers to a cyclic, fully unsaturated, hydrocarbon group. Aryl is exemplified by, but not limited to, phenyl, tolyl, xylyl, and naphthyl. Monocyclic aryl groups may have 6 to 9 carbon atoms, alternatively 6 to 7 carbon atoms, and alternatively 6 carbon atoms. Polycyclic carbocycles may have 10 to 17 carbon atoms, alternatively 10 to 14 carbon atoms, and alternatively 12 to 14 carbon atoms.

"Aralkyl" refers to an alkyl group having a pendant and/or terminal aryl group or an aryl group having a pendant alkyl group. Exemplary aralkyl groups include benzyl, phenylethyl, phenyl propyl, and phenyl butyl.

"Carbocycle" and "carbocyclic" refer to a hydrocarbon ring. Carbocycles may be monocyclic or alternatively may be fused, bridged, or spiro polycyclic rings. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated or partially unsaturated. Carbocycles are exemplified by cycloalkyl groups and cycloalkenyl groups.

"Cycloalkyl" refers to a saturated carbocycle. Monocyclic cycloalkyl groups are exemplified by cyclobutyl, cyclopentyl, and cyclohexyl.

"Halogenated hydrocarbon" refers to a hydrocarbon where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups such as trifluoromethyl, fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3, 3-nonafluorohexyl, and 8,8,8,7,7-pentafluorooctyl; and chlorinated alkyl groups such as chloromethyl and 3-chloropropyl. Halogenated carbocyclic groups include fluorinated cycloalkyl groups such as 2,2-difluorocyclopropyl, 2,3-difluorocyclobutyl, 3,4-difluorocyclohexyl, and 3,4-difluoro-5-methylcycloheptyl; and chlorinated cycloalkyl groups such as 2,2-dichlorocyclopropyl, 2,3-dichlorocyclopentyl. Haloalkenyl groups include allyl chloride.

"Pigment" refers to any ingredient used to impart color to a reaction product of a composition described herein. Pigment as used herein includes both liquid and solid colorants.

Abbreviations used herein are defined as follows. The abbreviation "cP" means centiPoise, and "cSt" means centiStokes. "DP" means the degree of polymerization of a polymer. "FR-4" is the epoxy side of a copper-clad FR-4 (glass-reinforced epoxy) laminate. Such laminate having a thickness of 0.152 centimeters (cm) is available from Laird Plastics (West Palm Beach, Fl). "FTIR" means Fourier transform infrared spectroscopy. "GC" means gas chromatography. "GPC" means gel permeation chromatography. "Mn" means number average molecular weight. Mn may be measured using GPC. "Mw" means weight average molecular weight of a polymer. "NMR" means nuclear magnetic resonance. The abbreviation "mPa·s" means milliPascalseconds, and "ppm" means parts per million. "COD" means cyclooctadienyl. "Cp" means cyclopentyl. "Et" means ethyl. "Me" means methyl. "Ph" means phenyl. "Pr" means propyl and includes various structures such as iPr and nPr. "iPr" means isopropyl. "nPr" means normal propyl. "Bu" means butyl and includes various structures including nBu, sec-butyl, tBu, and iBu. "iBu" means isobutyl. "nBu" means normal butyl. "tBu" means tert-butyl. "Hex" means hexenyl. "PBT" means poly(butylene terephthalate). A PBT resin sheet having a thickness of 0.635 cm is sold under the name HYDEX 4101 (white) by Boedeker Plastics, Inc. (Shiner, Tex.). "RT" means room temperature of 25° C. "THF" means tetrahydrofuran. The abbreviation "μm" means micrometers. "Vi" means vinyl. "W/mK" means Watts per meter Kelvin.

A composition comprises:
(A) a condensation reaction catalyst,
(B) a polyorganosiloxane having an average, per molecule, of at least two hydrolyzable substituents,
(C) a crosslinker, and
(D) a thermally conductive filler. The composition is capable of curing by condensation reaction. The composition can be exposed to moisture to cure. The cured product is a thermally conductive reaction product that can be used for thermal management in (opto)electronic applications, such as die attach and thermal interface applications, which require the reaction product to be subjected to temperature cycles in an enclosed area.

Ingredient (A) in the composition is a condensation reaction catalyst. Tin compounds such as organotin compounds are useful as catalysts for the condensation reaction cure of the polyorganosiloxane composition described herein. Organotin compounds for condensation reaction catalysis are those where the valence of the tin is either +4 or +2, i.e., Tin (IV) compounds or Tin (II) compounds.

Examples of tin (IV) compounds include stannic salts of carboxylic acids such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin tris-uberate, dibutyl tin dioctanoate, dibutyl tin diformate, isobutyl tin triceroate, dimethyl tin dibutyrate, dimethyl tin di-neodeconoate, dibutyl tin di-neodeconoate, triethyl tin tartrate, dibutyl tin dibenzoate, butyltintri-2-ethylhexanoate, dioctyl tin diacetate, tin octylate, tin oleate, tin butyrate, tin naphthenate, dimethyl tin dichloride, a combination thereof, and/or a partial hydrolysis product thereof. Tin (IV) compounds are known in the art and are commercially available, such as Metatin® 740 and Fascat® 4202 from Acima Specialty Chemicals of Switzerland, Europe, which is a business unit of The Dow Chemical Company. Alternatively, ingredient (A) may be a dimethyl tin compound, such as dimethyl tin dilaurate, dimethyl tin dibutyrate, dimethyl tin di-neodeconoate, dimethyl tin dichloride, or a combination thereof.

Examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthenate, stannous hexanoate, stannous succinate, stannous caprylate, and a combination thereof. Without wishing to be bound by theory, it is thought that a tin catalyst can be used to prepare a room temperature curable composition.

Alternatively, ingredient (A) may comprise a Ti, Zr, or Al condensation reaction catalyst. For example, chelates of Ti, Zr, and Al suitable for ingredient (A) include titanates, zirconates such as zirconium acetylacetonate, aluminum chelates such as aluminum acetylacetonate, and combinations thereof.

The amount of ingredient (A) is sufficient to catalyze condensation reaction of the hydrolyzable substituents on ingredients (B) and (C). The exact amount of ingredient (A) depends on various factors including the types of hydrolyzable substituents on ingredients (B) and (C), the selection of ingredient (A), whether any additional ingredients are added to the composition and the desired reaction speed. However, the amount of ingredient (A) may be 0.01 to 2% based on the combined weight of all ingredients in the composition.

Ingredient (B) is a polyorganosiloxane with a hydrolyzable substituent capable of reacting by condensation reaction. Ingredient (B) comprises a polyorganosiloxane backbone having an average, per molecule, of one or more hydrolyzable substituents covalently bonded to a silicon atom in the backbone. The polyorganosiloxane backbone may be a polydiorganosiloxane. The hydrolyzable substituents are exemplified by hydrogen atoms; halogen atoms; amido groups such as acetamido groups, benzamido groups, or methylacetamido groups; acyloxy groups such as acetoxy groups; hydrocarbonoxy groups such as alkoxy groups or alkenyloxy groups; amino groups; aminoxy groups; hydroxyl groups; mercapto groups; oximo groups; ketoximo groups; or a combination thereof. Alternatively, ingredient (B) may have an average of two or more hydrolyzable substituents per molecule. The hydrolyzable substituent in ingredient (B) may be located at terminal, pendant, or both terminal and pendant positions (i.e., when more than one hydrolyzable substituent is present), on the polyorganosiloxane backbone. Alternatively, the hydrolyzable substituent in ingredient (B) may be located at one or more terminal positions on the polymer backbone. Ingredient (B) may comprise a linear, branched, cyclic, or resinous structure. Alternatively, ingredient (B) may comprise a linear, branched or cyclic structure. Alternatively, ingredient (B) may comprise a linear or branched structure. Alternatively, ingredient (B) may comprise a linear structure. Alternatively, ingredient (B) may comprise a linear structure and a resinous structure. Ingredient (B) may comprise a homopolymer or an interpolymer (having two or more repeat units from different monomers) or a combination thereof. Alternatively, ingredient (B) may comprise a silanol-functional polyorganosiloxane.

Ingredient (B) may have a polyorganosiloxane backbone with a linear structure, i.e., a polydiorganosiloxane. When ingredient (B) has a polydiorganosiloxane backbone, ingredient (B) may comprise an alkoxy-endblocked polydiorganosiloxane, a silanol-terminated polydiorganosiloxane, or a combination thereof.

Ingredient (B) may comprise a polydiorganosiloxane of formula (I):

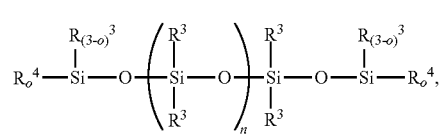

where each $R^4$ is independently a hydrolyzable substituent, each $R^3$ is independently a monovalent organic group, each subscript o is independently 1, 2, or 3, and subscript n is an integer having a value sufficient to provide the polydiorganosiloxane with a viscosity of at least 75 mPa·s at 25° C. and/or a DP of at least 60. DP may be measured by GPC using polystyrene standards calibration. Alternatively, subscript n may have a value ranging from 1 to 200,000.

Suitable hydrolyzable substituents for $R^4$ include, but are not limited to, halogen atoms; amido groups such as acetamido groups, benzamido groups, or methylacetamido groups; acyloxy groups such as acetoxy groups; hydrocarbonoxy groups such as alkoxy groups or alkenyloxy groups; amino groups; aminoxy groups; hydroxyl groups; mercapto groups; oximo groups; ketoximo groups; or a combination thereof. Alternatively, each $R^4$ may be independently selected from a halogen atom, an acetamido group, an acyloxy group such as acetoxy, an alkoxy group, an amido group, an amino group, an aminoxy group, a hydroxyl group, an oximo group, a ketoximo group, and a methylacetamido group. Alternatively, $R^4$ may be selected from hydroxyl groups and hydrocarbonoxy groups. Alternatively, $R^4$ may be selected from hydroxyl groups and alkoxy groups. Alternatively, each $R^4$ may a hydroxyl group.

Suitable organic groups for $R^3$ include, but are not limited to, monovalent organic groups such as hydrocarbon groups and halogenated hydrocarbon groups. Examples of monovalent hydrocarbon groups for $R^3$ include, but are not limited to, alkyl, carbocycle, aryl, and aralkyl groups. Alkyl groups are exemplified by Me, Et, Pr, and Bu. Carbocyclic groups are exemplified by cycloalkyl and cycloalkenyl such as cyclooctadienyl. Aryl groups are exemplified by Ph, tolyl, and xylyl. Aralkyl are exemplified by benzyl and 2-phenylethyl. Examples of halogenated hydrocarbon groups for $R^3$ include, but are not limited to, chloromethyl 3,3,3-trifluoropropyl, and 6,6,6,5,5,4,4,3,3-nonafluorohexyl. Examples of other monovalent organic groups for $R^3$ include, but are not limited to, monovalent hydrocarbon groups substituted with oxygen atoms such as glycidoxyalkyl, and hydrocarbon groups substituted with nitrogen atoms such as aminoalkyl and cyano-functional groups such as cyanoethyl and cyanopropyl. Alternatively, each $R^3$ may be an alkyl group such as Me or an aryl group such as Ph. Alternatively, each $R^3$ may be an alkyl group such as Me.

Ingredient (B) may comprise an α,ω-difunctional-polydiorganosiloxane when, in formula (I) above, each subscript o is 1. For example, ingredient (B) may have formula (II): $R^4R^3{}_2SiO—(R^3{}_2SiO)_p—SiR^3{}_2R^4$, where $R^3$ and $R^4$ are as described above and subscript p is an integer having a value sufficient to give the polydiorganosiloxane of formula (II) the viscosity and/or DP described above. Alternatively, subscript p may have a value from 50 to 200,000, alternatively 50 to 1,000, and alternatively 200 to 700.

Exemplary silanol-terminated polydiorganosiloxanes are silanol-terminated polydimethylsiloxanes. Silanol-terminated polydiorganosiloxanes suitable for use as ingredient (B) may be prepared by methods known in the art, such as hydrolysis and condensation of the corresponding organohalosilanes or equilibration of cyclic polydiorganosiloxanes.

Alternatively, ingredient (B) may comprise a silicone resin, in addition to, or instead of, one of the polyorganosiloxanes described above for ingredient (B). Suitable silicone resins are exemplified by an MQ resin, which comprises siloxane units of the formulae: $R^5{}_qSiO_{1/2}$ and $SiO_{4/2}$, where $R^5$ is as described for $R^3$; and each instance of subscript q is 0, 1, or 2. Alternatively, each $R^5$ may be an alkyl group. The MQ resin may have a molar ratio of M units to Q units (M:Q) ranging from 0.5:1 to 1.5:1. These mole ratios are conveniently measured by $Si^{29}$ NMR spectroscopy. This technique is capable of quantitatively determining the concentration of $R^5{}_3SiO_{1/2}$ ("M") and $SiO_{4/2}$ ("Q") units and the total hydroxyl content of the silicone resin.

The MQ silicone resin is soluble in solvents such as liquid hydrocarbons exemplified by benzene, toluene, xylene, and heptane, or in liquid organosilicon compounds such as a low viscosity cyclic and linear polydiorganosiloxanes.

The MQ silicone resin may contain 2.0% or less, alternatively 0.7% or less, alternatively 0.3% or less, of terminal units represented by the formula $R^6SiO_{3/2}$, where $R^6$ represents a hydrolyzable substituent described above for $R^6$, alternatively the hydrolyzable substituent for $R^6$ may be as hydroxyl, alkoxy such as methoxy and ethoxy; alkenyloxy such as isopropenyloxy; ketoximo such as methyethylketoximo; carboxy such as acetoxy; amidoxy such as acetamidoxy; and aminoxy such as N,N-dimethylaminoxy.

The Mn desired to achieve the desired flow characteristics of the MQ silicone resin can depend at least in part on the Mn of the silicone resin and the type of organic group, represented by $R^5$, that are present in this ingredient. The Mn of the MQ silicone resin is typically greater than 3,000 grams per mole (g/mol), more typically from 4500 to 7500 g/mol.

The MQ silicone resin can be prepared by any suitable method. Silicone resins of this type have reportedly been prepared by cohydrolysis of the corresponding silanes or by silica hydrosol capping methods known in the art. Briefly stated, the method involves reacting a silica hydrosol under acidic conditions with a hydrolyzable triorganosilane such as trimethylchlorosilane, a siloxane such as hexamethyldisiloxane, or a combination thereof, and recovering a product comprising M and Q units (MQ resin). The resulting MQ resins may contain from 2 to 5 percent by weight of silicon-bonded hydroxyl groups.

The intermediates used to prepare the MQ silicone resin may be triorganosilanes of the formula $R^5{}_3SiR^6$, where $R^5$ and $R^6$ are as described above, and either a silane with four hydrolyzable groups such as halogen, alkoxy or hydroxyl, or an alkali metal silicate such as sodium silicate.

Various suitable MQ resins are commercially available from sources such as Dow Corning Corporation of Midland, Mich., U.S.A., Momentive Performance Materials of Albany, N.Y., U.S.A., and Bluestar Silicones USA Corp. of East Brunswick, N.J., U.S.A. For example, DOW CORNING® MQ-1600 Solid Resin, DOW CORNING® MQ-1601 Solid Resin, and DOW CORNING® 1250 Surfactant, DOW CORNING® 7466 Resin, and DOW CORNING® 7366 Resin, all of which are commercially available from Dow Corning Corporation, are suitable for use in the methods described herein. Alternatively, a resin containing M, T, and Q units may be used, such as DOW CORNING® MQ-1640 Flake Resin, which is also commercially available from Dow Corning Corporation. Such resins may be supplied in organic solvent.

Alternatively, the silicone resin may comprise a silsesquioxane resin, i.e., a resin containing T units of formula $(R^7SiO_{3/2})$. Each $R^7$ may be independently selected from a hydrogen atom and a monovalent organic group, such as a monovalent hydrocarbon group exemplified by alkyl, carbocyclic, aryl, and aralkyl; and a monovalent halogenated hydrocarbon group such as haloalkyl, halogenated cycloalkyl, and haloalkenyl. Other monovalent organic groups for $R^7$ may be a monovalent hydrocarbon group substituted with oxygen atoms such as glycidoxyalkyl, and a monovalent hydrocarbon group substituted with a nitrogen atom such as aminoalkyl and cyano-functional groups such as cyanoethyl and cyanopropyl. Silsesquioxane resins suitable for use herein are known in the art and are commercially available. For example, a methylmethoxysiloxane methylsilsesquioxane resin having a DP of 15 and a weight average molecular weight (Mw) of 1200 g/mol is commercially available as DOW CORNING® US-CF 2403 Resin from Dow Corning Corporation of Midland, Mich., U.S.A. Alternatively, the silsesquioxane resin may have phenylsilsesquioxane units, methylsilsesquioxane units, or a combination thereof. Such resins are known in the art and are commercially available as DOW CORNING® 200 Flake resins, also available from Dow Corning Corporation. Alternatively, the silicone resin may comprise D units of formulae $(R^7{}_2SiO_{2/2})$ and/or $(R^7R^8SiO_{2/2})$ and T units of formulae $(R^7SiO_{3/2})$ and/or $(R^8SiO_{3/2})$, i.e., a DT resin, where $R^7$ is as described above and $R^8$ is a hydrolyzable group such as group $R^4$ described above. DT resins are known in the art and are commercially available, for example, methoxy functional DT resins include DOW CORNING® 3074 and DOW CORNING® 3037 resins; and silanol functional resins include DOW CORNING® 800 Series resins, which are also commercially available from Dow Corning Corporation. Other suitable resins include DT resins containing methyl and phenyl groups.

The amount of silicone resin added to the composition can vary depending on the end use of the composition. For example, when the reaction product of the composition is a gel, little or no silicone resin may be added. However, the amount of silicone resin in the composition may range from 0% to 90%, alternatively 0.1% to 50%, based on the weight of ingredient (B).

The amount of ingredient (B) can depend on various factors including the end use of the reaction product of the composition, the type of base polymer selected for ingredient (B), and the type(s) and amount(s) of any additional ingredient(s) present, if any. However, the amount of ingredient (B) may range from 0.01% to 50%, alternatively 10% to 50% based on the combined weights of all ingredients in the composition.

Ingredient (B) can be one single polyorganosiloxane or a combination comprising two or more polyorganosiloxanes that differ in at least one of the following properties: average molecular weight, hydrolyzable substituents, siloxane units, sequence, and viscosity.

Ingredient (C) is a crosslinker. Ingredient (C) may be selected with hydrolyzable substituent functionality that can vary depending on the degree of crosslinking desired in the thermally conductive product prepared by reacting the composition and such that the product does not exhibit too much weight loss from by-products of the condensation reaction. The selection of ingredient (C) may be made such that the composition remains sufficiently reactable to be useful during storage for several months in a moisture impermeable package. Ingredient (C) may be selected such that the hydrolyzable substituents on ingredient (C) are reactive with ingredient (B). For example, when the hydrolyzable substituent in ingredient (B) is a hydroxyl group, then the hydrolyzable substituent for ingredient (C) may be a halogen atom; an amido group, an acyloxy groups, a hydrocarbonoxy group, an amino group, an aminoxy group, a mercapto group, an oximo group, a ketoximo group, or an alkoxysilylhydrocarbylene group, or a combination thereof. The exact amount of ingredient (C) can vary depending on factors including the type of polyorganosiloxane selected for ingredient (B), the type of crosslinker selected for ingredient (C), the reactivity of the hydrolyzable substituents on ingredients (B) and (C), and the desired crosslink density of the reaction product. However, the amount of crosslinker may range from 0.5 to 500 parts based on 100 parts by weight of ingredient (B).

Ingredient (C) comprises a crosslinker having unit formula (III): $(R^1{}_2R^2SiO_{1/2})_f(R^1R^2SiO_{2/2})_g(R^2SiO_{3/2})_h (R^1{}_3SiO_{1/2})_i(R^1{}_2SiO_{2/2})_j(R^1SiO_{3/2})_k(SiO_{4/2})_l$, where subscripts f, g, h, i, j, k, and l are integers; subscript f≥0, subscript g≥0, subscript h≥0, with the proviso that a quantity (f+g+h)≥2, subscript i≥0, subscript j≥0, with the proviso that a quantity (g+j)≥2, subscript k≥0, subscript l≥0, each $R^1$ is independently a monovalent organic group, and each $R^2$ has formula

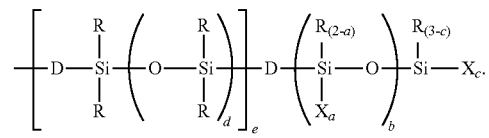

In the formula for $R^2$, each D is independently a divalent organic group, each X is independently a hydrolyzable substituent, each R is independently a monovalent organic group, subscript a is 0, 1, or 2, subscript b≥0, subscript c is 0, 1, 2, or 3, with the proviso that a quantity (a+c)≥1, and with the proviso that when a quantity (a+c)=1, then a quantity (f+g+h)≥3, subscript d≥1, and subscript e is 0 or 1.

In unit formula (III), $R^1$ is a monovalent organic group. Suitable organic groups for $R^1$ include, but are not limited to, monovalent organic groups such as hydrocarbon groups and halogenated hydrocarbon groups. Examples of monovalent hydrocarbon groups for $R^1$ include, but are not limited to, alkyl, carbocycle, aryl, and aralkyl groups. Alkyl groups are exemplified by Me, Et, Pr, and Bu. Carbocyclic groups are exemplified by cycloalkyl and cycloalkenyl such as cyclooctadienyl. Aryl groups are exemplified by Ph, tolyl, and xylyl. Aralkyl are exemplified by benzyl and 2-phenylethyl. Examples of halogenated hydrocarbon groups for $R^1$ include, but are not limited to, chloromethyl 3,3,3-trifluoropropyl, and 6,6,6,5,5,4,4,3,3-nonafluorohexyl. Examples of other monovalent organic groups for $R^1$ include, but are not limited to, hydrocarbon groups substituted with oxygen atoms such as glycidoxyalkyl, and hydrocarbon groups substituted with nitrogen atoms such as aminoalkyl and cyano-functional groups such as cyanoethyl and cyanopropyl. Alternatively, each $R^1$ may be an alkyl group such as Me or an aryl group such as Ph. Alternatively, each $R^1$ may be an alkyl group such as Me.

In group $R^2$ of unit formula (III), each D independently represents a divalent organic group. Alternatively, each D may be a divalent hydrocarbon group. Divalent hydrocarbon groups suitable for D are exemplified by an alkylene group such as ethylene, propylene, butylene, or hexylene; an arylene group such as phenylene, or an alkylarylene group such as:

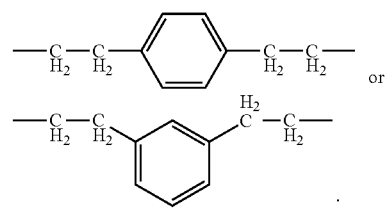

Alternatively, when a molecule has more than one instance of D, each instance of D may be the same or different.

In group $R^2$ of unit formula (III), each X independently represents a hydrolyzable substituent. Exemplary hydrolyzable substituents for X are described above for $R^4$. Alternatively, each X may be a hydrolyzable substituent independently selected from the group consisting of an alkoxy group; an alkenyloxy group; an amido group, such as an acetamido, a methylacetamido group, or benzamido group; an acyloxy group such as acetoxy; an amino group; an aminoxy group; a hydroxyl group; a mercapto group; an oximo group; a ketoximo group; and a halogen atom. Alternatively, each X may be independently selected from the group consisting of an alkoxy group, an amido group, an acyloxy group, an amino group, a hydroxyl group, and an oximo group. Alternatively, each X may be a hydrocarbonoxy group such as an alkoxy group.

In group $R^2$ of unit formula (III), R represents a monovalent organic group, such as a monovalent hydrocarbon group. Alternatively, each R may be independently selected from alkyl groups of 1 to 20 carbon atoms, carbocyclic groups of 5 to 20 carbon atoms, aryl groups of 6 to 20 carbon atoms, and aralkyl groups of 7 to 20 carbon atoms. Alternatively, each R may be an alkyl group, such as Me.

In group $R^2$ of unit formula (III), subscript c represents 0, 1, 2, or 3; subscript a represents 0, 1, or 2; and subscript b has a value of 0 or greater, with the proviso that the sum of (a+c) is at least 1, such that, on average, at least one X is present in the formula. Alternatively, subscript b may have a value ranging from 0 to 18. Alternatively, subscript b may be 0.

Ingredient (C) may comprise the $R^2$ groups in an amount ranging from 0.2 mol % to 10 mol %, alternatively 0.5 mol % to 5 mol %, alternatively 0.5 mol % to 2.0 mol %, alternatively 0.5 mol % to 1.5 mol %, and alternatively 0.6 mol % to 1.2 mol % based on the amount of hydrolyzable substituents on ingredient (B).

Alternatively, in unit formula (III), the quantity (g+j) may have an average value of at least 5, alternatively at least 100, alternatively at least 150, and alternatively 150 to 500. Alternatively, the quantity (f+g+h)=2. Alternatively, f=2, g=0, and h=0. Alternatively, ingredient (C) may comprise an alkoxysilylhydrocarbylene-endblocked polydiorganosiloxane. Alkoxysilylhydrocarbylene-endblocked polydiorganosiloxanes may be prepared by reacting a vinyl-terminated, polydimethylsiloxane with (alkoxysilylhydrocarbyl) tetramethyldisiloxane.

Alternatively, ingredient (C) may comprise a crosslinker of formula (IV):

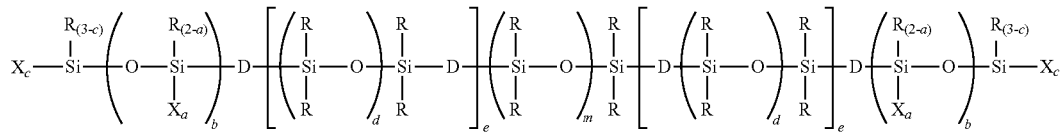

where, D, X, R, and subscripts a, b, c, d, and e are as described above, with the proviso that subscripts a, b, and c are selected such that the crosslinker of formula (IV) has an average, per molecule, of at least three instances of X (i.e., a quantity (a+b+c)≥3), and subscript m has an average value of at least 100. Alternatively, subscript m has an average value of 150 to 500.

Alternatively, ingredient (C) may comprise a crosslinker of formula (V):

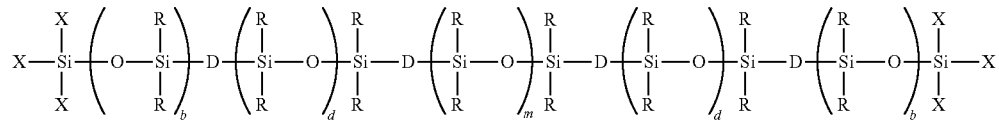

where
each D is independently an alkylene group,
each X is independently an alkoxy group,
each R is an alkyl group,
each subscript b≥0,
each subscript 2≥d≥1, and
subscript m has an average value of 150 to 500.

Alternatively in formula (V), each D may be an ethylene group, each X may be methoxy, and each R may be Me, and subscript d may be 1.

The amount of ingredient (C) in the composition depends on various factors including the catalyst selected for ingredient (A), the type and amount of hydrolyzable groups on ingredient (B), the type and amount of hydrolyzable groups on ingredient (C), the desired form of the cured product of the composition, and whether any additional ingredients are added to the composition. However, the amount of ingredient (C) in the composition may range from 5% to 50% based on the combined weight of all ingredients in the composition.

Ingredient (C) may optionally further comprise ingredient (C') a silane crosslinker having hydrolyzable groups or partial or full hydrolysis products thereof. Ingredient (C) has an average, per molecule, of greater than two substituents reactive with the hydrolyzable substituents on ingredient (B). Examples of suitable silane crosslinkers for ingredient (C) may have the general formula (III) $R^{10}_r Si(R^9)_{(4-r)}$, where each $R^{10}$ is independently a monovalent hydrocarbon group such as an alkyl group; each $R^9$ is a hydrolyzable substituent, which can be selected from those for X described above for ingredient (C). Alternatively, each $R^9$ may be, for example, a hydrogen atom, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and each instance of subscript r may be 0, 1, 2, or 3. For ingredient (C), subscript r has an average value greater than 2. Alternatively, subscript r may have a value ranging from 3 to 4. Alternatively, each $R^9$ may be independently selected from hydroxyl, alkoxy, acetoxy, amide, or oxime. Alternatively, each $R^9$ may be alkoxy, such as methoxy. Alternatively, ingredient (C) may be selected from an acyloxysilane, an alkoxysilane, a ketoximosilane, and an oximosilane. Alternatively, ingredient (C) may be an alkoxysilane.

Ingredient (C) may comprise an alkoxysilane exemplified by a dialkoxysilane, such as a dialkyldialkoxysilane; a trialkoxysilane, such as an alkyltrialkoxysilane; a tetraalkoxysilane; or partial or full hydrolysis products thereof, or another combination thereof. Examples of suitable trialkoxysilanes include methyltrimethoxysilane, methyltriethoxysilane, ethyltrimethoxysilane, ethyltriethoxysilane, isobutyltrimethoxysilane, isobutyltriethoxysilane, and a combination thereof, and alternatively methyltrimethoxysilane. Examples of suitable tetraalkoxysilanes include tetraethoxysilane.

Ingredient (C) can be one single crosslinker or a combination comprising two or more crosslinkers that differ in at least one of the following properties: hydrolyzable substituents and other organic groups bonded to silicon, and when a polymeric crosslinker is used, siloxane units, structure, molecular weight, and sequence.

Ingredient (D) is a conductive filler. Conductive fillers may be thermally conductive, electrically conductive, or both. Conductive fillers are known in the art and are exemplified by metal particulates (such as aluminum, copper, gold, nickel, silver, and combinations thereof); such metals coated on nonconductive substrates; metal oxides (such as aluminum oxide, beryllium oxide, magnesium oxide, zinc oxide, and combinations thereof), meltable fillers (e.g., solder), aluminum nitride, aluminum trihydrate, barium titanate, boron nitride, carbon fibers, diamond, graphite, magnesium hydroxide, onyx, silicon carbide, tungsten carbide, and a combination thereof.

Ingredient (D) may be both thermally conductive and electrically conductive. Alternatively, ingredient (D) may be thermally conductive and electrically insulating. Ingredient (D) may be selected from the group consisting of aluminum nitride, aluminum oxide, aluminum trihydrate, barium titanate, beryllium oxide, boron nitride, carbon fibers, diamond, graphite, magnesium hydroxide, magnesium oxide, metal particulate, onyx, silicon carbide, tungsten carbide, zinc oxide, and a combination thereof. Ingredient (D) may comprise a metallic filler, an inorganic filler, a meltable filler, or a combination thereof. Metallic fillers include particles of metals and particles of metals having layers on the surfaces of the particles. These layers may be, for example, metal nitride layers or metal oxide layers on the surfaces of the particles. Suitable metallic fillers are exemplified by particles of metals selected from the group consisting of aluminum, copper, gold, nickel, silver, and combinations thereof, and alternatively aluminum. Suitable metallic fillers are further exemplified by particles of the metals listed above having layers on their surfaces selected from the group consisting of aluminum nitride, aluminum oxide, copper oxide, nickel oxide, silver oxide, and combinations thereof. For example, the metallic filler may comprise aluminum particles having aluminum oxide layers on their surfaces.

Inorganic conductive fillers are exemplified by onyx; aluminum trihydrate, metal oxides such as aluminum oxide, beryllium oxide, magnesium oxide, and zinc oxide; nitrides such as aluminum nitride and boron nitride; carbides such as silicon carbide and tungsten carbide; and combinations thereof. Alternatively, inorganic conductive fillers are exemplified by aluminum oxide, zinc oxide, and combinations thereof. Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point ranging from 50° C. to 250° C., alternatively 50° C. to 225° C. The meltable filler may be a eutectic alloy, a non-eutectic alloy, or a pure metal. Meltable fillers are commercially available.

For example, meltable fillers may be obtained from Indium Corporation of America, Utica, N.Y., U.S.A.; Arconium, Providence, R.I., U.S.A.; and AIM Solder, Cranston, R.I., U.S.A. Other thermally conductive fillers are also commercially available. For example, aluminum fillers are available, for example, from Toyal America, Inc. of Naperville, Ill., U.S.A. and Valimet Inc., of Stockton, Calif., U.S.A. Silver filler is commercially available from Metalor Technologies U.S.A. Corp. of Attleboro, Mass., U.S.A. The same filler, e.g., Aluminum oxide fillers, but with differing particle sizes may be used in the composition. CB-A20S and Al-43-Me are aluminum oxide fillers of differing particle sizes commercially available from Showa-Denko, and AA-04, AA-2, and AA18 are aluminum oxide fillers commercially available from Sumitomo Chemical Company. Zinc oxides, such as zinc oxides having trademarks KADOX® and XX®, are commercially available from Zinc Corporation of America of Monaca, Pa., U.S.A.

The shape of the filler particles is not specifically restricted, however, rounded or spherical particles may prevent viscosity increase to an undesirable level upon high loading of the filler in the composition.

Ingredient (D) may be a single filler or a combination of two or more fillers that differ in at least one property such as particle shape, average particle size, particle size distribution, and type of filler. For example, it may be desirable to use a combination of fillers, such as a first filler having a larger average particle size and a second filler having a smaller average particle size. Use of a first filler having a larger average particle size and a second filler having a smaller average particle size than the first filler may improve packing efficiency and/or may reduce viscosity of the composition as compared to a composition without such a combination of fillers.

The average particle size of the filler will depend on various factors including the type of the filler selected for ingredient (D) and the exact amount added to the composition, as well as the end use for the reaction product of the composition. However, the filler may have an average particle size ranging from 0.1 µm to 80 µm, alternatively 0.1 µm to 50 µm, and alternatively 0.1 µm to 10 µm. Filler particle size and size distribution can be determined using equipment such as Microtrac S3500 using ASTM UOP856-07 Particle Size Distribution of Powders by Laser Light Scattering.

The amount of ingredient (D) in the composition depends on various factors including the end use selected for the composition and the reaction product of the composition, the type and amounts of ingredients (B) and (C), and the type and amount of the filler selected for ingredient (D). However, the amount of ingredient (D) may range from 10 vol % to 80 vol %, alternatively 50 vol % to 75 vol %, and alternatively 30% to 80%, by volume of the composition. Without wishing to be bound by theory, it is thought that when the amount of filler is greater than 80 vol %, the composition may react to form a reaction product with insufficient structural integrity for some applications.

The composition described above may optionally further comprise one or more additional ingredients such as (E) a spacer, (F) a pigment, (G) a treating agent, (H) an adhesion promoter, and/or (J) a drying agent.

Ingredient (E) is a spacer. Spacers may be used, for example, to affect the bondline thickness of a cured product of the composition when the composition is interposed between substrates. Spacers can comprise organic particles, inorganic particles, or a combination thereof. Spacers can be thermally conductive, electrically conductive, or both. Alternatively, spacers may be thermally conductive and electrically insulating. Spacers can have a desired particle size, for example, particle size may range from 25 µm to 125 µm. Spacers can comprise monodisperse beads, such as glass or polymer (e.g., polystyrene) beads. Spacers can comprise thermally conductive fillers such as alumina, aluminum nitride, atomized metal powders, boron nitride, copper, and silver. The amount of ingredient (E) depends on various factors including the particle size distribution, pressure to be applied during use of the composition or the cured product prepared therefrom, temperature during use, and desired thickness of the composition or the cured product prepared therefrom. However, the composition may contain an amount of ingredient (E) ranging from 0.05% to 2%, alternatively 0.1% to 1% based on combined weight of all ingredients in the composition.

Ingredient (F) is a pigment. The amount of pigment depends on various factors including the type of pigment selected and the desired degree of coloration of the reaction product. For example, the composition may comprise 0 to 20%, alternatively 0.001% to 5%, of a pigment based on the weight of all ingredients in the composition.

Examples of suitable pigments include indigo, titanium dioxide Stan-Tone 50SP01 Green (which is commercially available from PolyOne) and carbon black. Representative, non-limiting examples of carbon black include Shawinigan Acetylene black, which is commercially available from Chevron Phillips Chemical Company LP; SUPERJET® Carbon Black (LB-1011) supplied by Elementis Pigments Inc., of Fairview Heights, Ill. U.S.A.; SR 511 supplied by Sid Richardson Carbon Co, of Akron, Ohio U.S.A.; and N330, N550, N762, N990 (from Degussa Engineered Carbons of Parsippany, N.J., U.S.A.).

The composition may optionally further comprise ingredient (G) a treating agent. The amount of ingredient (G) will vary depending on factors such as the type of treating agent selected and the type and amount of particulates (filler, and if present, pigment, spacer, and/or physical drying agent) to be treated, and whether the particulates are treated before being added to the composition, or whether the particulates are treated in situ. However, ingredient (G) may be used in an amount ranging from 0.01% to 20%, alternatively 0.1% to 15%, and alternatively 0.5% to 5%, based on the weight of all ingredients in the composition. Particulates, such as the filler, and when present the pigment, spacer and/or the physical drying agent, may optionally be surface treated with ingredient (G). Particulates may be treated with ingredient (G) before being added to the composition, or in situ. Ingredient (G) may comprise an alkoxysilane, an alkoxy-functional oligosiloxane, a cyclic polyorganosiloxane, a hydroxyl-functional oligosiloxane such as a dimethyl siloxane or methyl phenyl siloxane, or a fatty acid. Examples of fatty acids include stearates such as calcium stearate.

Some representative organosilicon filler treating agents that can be used as ingredient (G) include compositions normally used to treat silica fillers such as organochlorosilanes, organosiloxanes, organodisilazanes such as hexaalkyl disilazane, and organoalkoxysilanes such as $C_6H_{13}Si(OCH_3)_3$, $C_8H_{17}Si(OC_2H_5)_3$, $C_{10}H_{21}Si(OCH_3)_3$, $C_{12}H_{25}Si(OCH_3)_3$, $C_{14}H_{29}Si(OC_2H_5)_3$, and $C_6H_5CH_2CH_2Si(OCH_3)_3$. Other treating agents that can be used include alkylthiols, fatty acids, titanates, titanate coupling agents, zirconate coupling agents, and combinations thereof.

Alternatively, ingredient (G) may comprise an alkoxysilane having the formula: $R^{11}_m Si(OR^{12})_{(4-m)}$, where subscript m may have a value ranging from 1 to 3, alternatively subscript m is 3. Each $R^{11}$ is independently a monovalent organic group, such as a monovalent hydrocarbon group of 1 to 50 carbon atoms, alternatively 8 to 30 carbon atoms, alternatively 8 to 18 carbon atoms. $R^{11}$ is exemplified by alkyl groups such as hexyl, octyl, dodecyl, tetradecyl, hexadecyl, and octadecyl; and aralkyl groups such as benzyl and phenylethyl. $R^{11}$ may be saturated or unsaturated, and branched or unbranched. Alternatively, $R^{11}$ may be saturated and unbranched. Alternatively, $R^{11}$ may be independently selected from methyl, butyl, propyl, hexyl, octyl, decyl, dodecyl, tetradecyl, hexadecyl, and octadecyl.

Each $R^{12}$ is independently a saturated hydrocarbon group of 1 to 4 carbon atoms, alternatively 1 to 2 carbon atoms. Alkoxysilanes suitable for use as ingredient (G) are exemplified by hexyltrimethoxysilane, octyltriethoxysilane, decyltrimethoxysilane, dodecyltrimethoxysilane, tetradecyltrimethoxysilane, phenylethyltrimethoxysilane, octadecyltrimethoxysilane, octadecyltriethoxysilane, and combinations thereof.

Alkoxy-functional oligosiloxanes may also be used as treating agents. For example, suitable alkoxy-functional oligosiloxanes include those of the formula (V): $(R^{13}O)_n Si(OSiR^{14}_2 R^{15})_{(4-n)}$. In this formula, subscript n is 1, 2 or 3, alternatively subscript n is 3. Each $R^{13}$ may be an alkyl group. Each $R^{14}$ may be an unsaturated monovalent hydrocarbon group of 1 to 10 carbon atoms. Each $R^{15}$ may be an unsaturated monovalent hydrocarbon group having at least 10 carbon atoms.

Suitable adhesion promoters for ingredient (H) may comprise a transition metal chelate, a hydrocarbonoxysilane such as an alkoxysilane, a combination of an alkoxysilane and a hydroxy-functional polyorganosiloxane, an amino-functional silane, or a combination thereof. Adhesion promoters are known in the art and may comprise silanes having the formula $R^8_t R^9_u Si(OR^{10})_{4-(t+u)}$ where each $R^8$ is independently a monovalent organic group having at least 3 carbon atoms; $R^9$ contains at least one substituent having an adhesion-promoting group, such as amino-functional, epoxy-functional, mercapto-functional, or acrylate-functional groups; $R^{10}$ is a hydrocarbon group of 1 to 6 carbon atoms, subscript t has a value ranging from 0 to 2; subscript u is either 1 or 2; and a quantity (t+u) is not greater than 3. Alternatively, the adhesion promoter may comprise a partial condensate of the above silane. Alternatively, the adhesion promoter may comprise a combination of an alkoxysilane and a hydroxy-functional polyorganosiloxane. Alternatively, the adhesion promoter may comprise a combination of an alkyltrialkoxysilane, an epoxy-functional trialkoxysilane, and an amino-functional trialkoxysilane.

Alternatively, the adhesion promoter may comprise an unsaturated or epoxy-functional compound. The adhesion promoter may comprise an unsaturated or epoxy-functional alkoxysilane. For example, the functional alkoxysilane can have the formula $R^{16}_v Si(OR^{17})_{(4-v)}$, where subscript v is 1, 2, or 3, alternatively subscript v is 1. Each $R^{16}$ is independently a monovalent organic group with the proviso that at least one $R^{16}$ is an unsaturated organic group or an epoxy-functional organic group. Epoxy-functional organic groups for $R^{16}$ are exemplified by 3-glycidoxypropyl and (epoxycyclohexyl)ethyl. Unsaturated organic groups for $R^{16}$ are exemplified by 3-methacryloyloxypropyl, 3-acryloyloxypropyl, and unsaturated monovalent hydrocarbon groups such as vinyl, allyl, hexenyl, undecylenyl. Each $R^{17}$ is independently a saturated hydrocarbon group of 1 to 4 carbon atoms, alternatively 1 to 2 carbon atoms. $R^{17}$ is exemplified by methyl, ethyl, propyl, and butyl.

Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

Alternatively, the adhesion promoter may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

Alternatively, the adhesion promoter may comprise an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and a combination thereof.

Alternatively, the adhesion promoter may comprise a transition metal chelate. Suitable transition metal chelates include titanates, zirconates such as zirconium acetylacetonate, aluminum chelates such as aluminum acetylacetonate, and combinations thereof.

The exact amount of ingredient (H) depends on various factors including the type of adhesion promoter selected as ingredient (H) and the end use of the composition and its reaction product. However, ingredient (H), when present, may be added to the composition in an amount ranging from 0.01 to 50 weight parts based on the weight of the composition, alternatively 0.1 to 10 weight parts, and alternatively 0.05 to 5 weight parts. Ingredient (H) may be one adhesion promoter. Alternatively, ingredient (H) may comprise two or more different adhesion promoters that differ in at least one of the following properties: structure, viscosity, average molecular weight, polymer units, and sequence.

Ingredient (J) is a drying agent. The drying agent binds water from various sources. For example, the drying agent may bind by-products of the condensation reaction, such as water and alcohols.

Examples of suitable adsorbents for ingredient (J) may be inorganic particulates. The adsorbent may have a particle size of 10 micrometers or less, alternatively 5 micrometers or less. The adsorbent may have average pore size sufficient to adsorb water and alcohols, for example 10 Å (Angstroms) or less, alternatively 5 Å or less, and alternatively 3 Å or less. Examples of adsorbents include zeolites such as chabasite, mordenite, and analcite; molecular sieves such as alkali metal alumino silicates, silica gel, silica-magnesia gel, activated carbon, activated alumina, calcium oxide, and combinations thereof.

Examples of commercially available drying agents include dry molecular sieves, such as 3 Å molecular sieves, which are commercially available from Grace Davidson under the trademark SYLOSIV® and from Zeochem of Louisville, Ky., U.S.A. under the trade name PURMOL, and 4 Å molecular sieves such as Doucil zeolite 4A available from Ineos Silicas of Warrington, England. Other useful molecular sieves include MOLSIV ADSORBENT TYPE 13X, 3A, 4A, and 5A, all of which are commercially available from UOP of Illinois, U.S.A.; SILIPORITE NK 30AP and 65xP from Atofina of Philadelphia, Pa., U.S.A.; and molecular sieves available from W.R. Grace of Maryland, U.S.A.

Alternatively, the drying agent may bind the water and/or other by-products by chemical means. An amount of a silane crosslinker added to the composition (in addition to ingredient (C)) may function as a chemical drying agent. Without wishing to be bound by theory, it is thought that the chemical drying agent may be added to the dry part of a multiple part composition to keep the composition free from water after the parts of the composition are mixed together. For example, alkoxysilanes suitable as drying agents include vinyltrimethoxysilane, vinyltriethoxysilane, and combinations thereof.

The amount of ingredient (J) depends on the specific drying agent selected. However, when ingredient (J) is a chemical drying agent, the amount may range from 0 parts to 5 parts, alternatively 0.1 parts to 0.5 parts. Ingredient (J) may be one chemical drying agent. Alternatively, ingredient (J) may comprise two or more different chemical drying agents.

Alternatively, other fillers may be added to the composition, the type and amount depending on factors including the end use of the cured product of the composition. Examples of such other fillers include magnetic particles such as ferrite; and dielectric particles such as fused glass microspheres, titania, and calcium carbonate. The other filler may comprise a reinforcing filler, an extending filler, or a combination thereof. For example, the composition may optionally further comprise a reinforcing filler, which when present may be added in an amount ranging from 0.1% to 10%, based on the weight of the composition. The exact amount of reinforcing filler depends on various factors including the form of the reaction product of the composition and how much conductive filler is added. Examples of suitable reinforcing fillers include reinforcing silica fillers such as fume silica, silica aerogel, silica xerogel, and precipitated silica. Fumed silicas are known in the art and commercially available; e.g., fumed silica sold under the name CAB-O-SIL by Cabot Corporation of Massachusetts, U.S.A.

The extending filler may be present in an amount ranging from 0.1% to 20%, based on the weight of the composition. Examples of extending fillers include crushed quartz, aluminum oxide, magnesium oxide, calcium carbonate such as precipitated calcium carbonate, zinc oxide, talc, diatomaceous earth, iron oxide, clays, mica, chalk, titanium dioxide, zirconia, sand, carbon black, graphite, or a combination thereof. Extending fillers are known in the art and commercially available; such as a ground silica sold under the name MIN-U-SIL by U.S. Silica of Berkeley Springs, W. Va. Suitable precipitated calcium carbonates included Winnofil® SPM from Solvay and Ultrapflex® and Ultrapflex® 100 from SMI.

When selecting ingredients for the composition described above, there may be overlap between types of ingredients because certain ingredients described herein may have more than one function. For example, certain alkoxysilanes may be useful as filler treating agents, supplemental crosslinkers, adhesion promoters and/or chemical drying agents; carbon black may be useful as a pigment and/or a filler; molecular sieves may be used as spacers and/or drying agents; and certain transition metal chelates such as Ti, Zr, and Al chelates may be useful both as condensation reaction catalysts and as adhesion promoters.

The composition described above may be prepared as a one part composition, for example, by combining all ingredients by any convenient means, such as mixing. For example, a one-part composition may be made by optionally combining (e.g., pretreating) the particulate ingredients (e.g., the filler and, if present, the spacer, the physical drying agent, and the pigment) and a treating agent, and mixing this with ingredients comprising ingredients (A), (B), and (C). Other additional ingredients, such as the adhesion promoter, may be added to the mixture at any desired stage. A final mixing step may be performed under substantially anhydrous conditions, and the resulting compositions are generally stored under substantially anhydrous conditions, for example in sealed containers, until ready for use.

Alternatively, the composition may be prepared as a multiple part (e.g., 2 part) composition. In this instance the catalyst and crosslinker are stored in separate parts, and the parts are combined shortly before use of the composition. For example, a two part curable composition may be prepared by combining ingredients comprising (A), (B), and (D) to form a first (curing agent) part by any convenient means such as mixing. A second (base) part may be prepared by combining ingredients comprising (B), (C), and (D) by any convenient means such as mixing. One or more of the additional ingredients may be added to the curing agent part. Alternatively, one or more of ingredients (E), (F), (G), and a physical drying agent may be added to the base part. The ingredients may be combined at ambient or elevated temperature and under ambient or anhydrous conditions, depending on various factors including whether a one part or multiple part composition is selected. The base part and curing agent part may be combined by any convenient means, such as mixing, shortly before use. The base part and curing agent part may be combined in relative amounts of base: curing agent ranging from 1:1 to 10:1, alternatively 9:1 to 10:1.

The equipment used for mixing the ingredients is not specifically restricted. Examples of suitable mixing equipment may be selected depending on the type and amount of each ingredient selected. For example, a static mixer or agitated batch kettle may be used for relatively low viscosity compositions, such as compositions that would react to form gums or gels. Alternatively, continuous compounding equipment, e.g., extruders such as twin screw extruders, may be used for more viscous compositions and compositions containing relatively high amounts of particulates. Exemplary methods that can be used to prepare the compositions described herein include those disclosed in, for example, U.S. Patent Publications US 2009/0291238 and US 2008/0300358.

These compositions made as described above may be stable when the stored in containers that protect the compositions from exposure to moisture, but these compositions may react via condensation reaction when exposed to atmospheric moisture. The compositions may react at room temperature (e.g., 25° C.) or with heating. Alternatively, the composition may be a room temperature curable composition.

The curable composition described above is useful for preparing thermally conductive rubbers, thermally conductive tapes, thermally conductive curable adhesives, and thermally conductive pressure sensitive adhesives. The curable compositions are especially useful for preparing thermally conductive silicone adhesives. Thermally conductive silicone adhesives have numerous applications including their use as die attach adhesives, solder replacements, and thermally conductive coatings and/or gaskets. Thermally conductive silicone adhesives are especially useful for bonding electronic components to flexible and/or rigid substrates.

Thermally conductive curable compositions can also be used for assembling electronic components, as substitutes for soldering, for preparing thermal interface materials, and for preparing thermally conductive inks and/or greases. The curable compositions can be pre-cured and dispensed in rolls or sheets as films, for application as pressure sensitive adhesives. They can also be dispensed wet and cured in place in final applications. Partially cured thermally conductive compositions can be used as thermally conductive greases. When the curable composition is used as a thermally conductive adhesive, the curable composition is particularly useful as a thermal interface material, in that it is capable of providing good bonding strength between heat sinks, heat spreaders, or heat dissipation devices, especially where the heat sink or heat dissipation device has a polymeric matrix.

EXAMPLES

The following ingredients were used in the examples below. Ingredient (A1) was dimethyl tin dineodeconoate. Ingredient (B1) was DOW CORNING® SFD-1, which is commercially available from Dow Corning Corporation of Midland, Mich. USA. Ingredient (C1) was a crosslinker of formula:

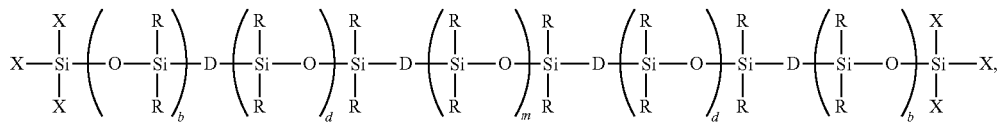

where each X is a methoxy group, each R is a methyl group, each D is an ethylene group, each subscript b is 2, each subscript d is 2, and subscript m has an average value of 450 (with a DP of 450). Ingredient (C2) was a crosslinker of formula:

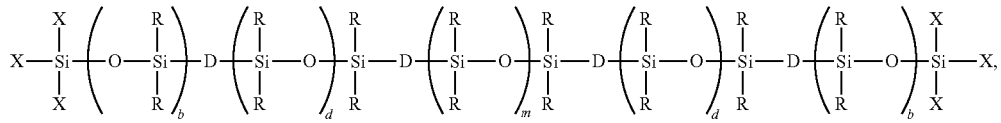

where each X is a methoxy group, each R is a methyl group, each D is an ethylene group, each subscript b is 2, each subscript d is 2, and subscript m has an average value of 150 (with a DP of 150). Ingredient (C3) was methyltrimethoxysilane which was commercially available from Dow Corning Corporation. Ingredient (D1) was a 1:1 mixture of commercially available alumina fillers, the first being a nonspherical alumina having particle size ranging from 1.5 to 2.3 μm, and the second being a spherical alumina having particle size ranging from 32 to 45 μm. Ingredient (H1) was aminopropyl glycidoxypropyl trimethoxysilane.

Samples were prepared by first pre-treating the alumina fillers with n-octyltriethoxysilane (nOTES). In this method, 100 parts of nonspherical alumina were mixed with 1.06 parts nOTES, and 100 parts of spherical alumina were mixed with 0.07 parts nOTES. To disperse the treating agent on the filler surface, each filler and treating agent were mixed in a dental mixer at 3600 rpm for 30 seconds. The samples were left overnight. The resulting fillers were dried in an oven at 105° C. for 2 hours to form treated fillers.

Compositions were then prepared by mixing the ingredients in Table 1. Compositions were coated on various substrates and exposed to ambient air for a period of time to cure. The substrates were as follows. FR-4 was the epoxy side of a copper-clad FR-4 (glass-reinforced epoxy) laminate having a thickness of 0.152 centimeters (cm), which is available from Laird Plastics (West Palm Beach, Fl). PBT was a poly(butylene terephthalate) resin sheet having a thickness of 0.635 cm, which is sold under the name HYDEX 4101 (white) by Boedeker Plastics, Inc. (Shiner, Tex.). Al was Aluminum substrate sold as AD grade from Q-Lab Corporation (Cleveland, Ohio). Ni/Al was a Nickel coated Aluminum substrate). Samples were evaluated for strength, hardness, and thermal conductivity. Tensile elongation in Table 2 was measured by ASTM D412, with die C and a pull rate of 20 inches/minute. Durometer was measured by ASTM D 2240. Thermal conductivity was measured using a Mathis TC-30. Lap shear in table 3 was measured as adhesion strength tested by ASTM D1002, where a lap shear sample had an overlap area of 1 inch×1 inch and a 20 mil bondline thickness. The pull rate to measure adhesion strength was 2 inches per minute.

TABLE 1

Ingredients in each sample, amounts in the table are in grams

| Spl | 1 | 2 | 3 | 4 | 5 | 6 | 7 | 8 | 9 | 10 | 11 | 12 |
|---|---|---|---|---|---|---|---|---|---|---|---|---|
| (A1) | 0.08 | 0.08 | 0.08 | 0.08 | 0.03 | 0.03 | 0.03 | 0.03 | 0.03 | 0.03 | 0.03 | 0.03 |
| (B1) | 20.8 | 20.8 | 20.8 | 10.4 | 10.4 | 8.4 | 9.4 | 5.5 | 5.5 | 5.5 | 18.8 | 11 |
| (C1) | 0 | 0 | 0 | 0 | 0 | 10.4 | 9.4 | 0 | 0 | 0 | 18.8 | 0 |
| (C2) | 0 | 0 | 0 | 8.45 | 8.45 | 0 | 0 | 13.2 | 13.2 | 12.7 | 0 | 26.4 |
| (C3) | 0.4 | 0.26 | 0.32 | 0 | 0 | 0 | 0.15 | 0 | 0.1 | 0 | 0.3 | 0.2 |
| (D1) | 108.4 | 108.4 | 108.4 | 96.4 | 96.4 | 96.4 | 96.4 | 96.4 | 96.4 | 96.4 | 192.8 | 192.8 |
| (H1) | 0 | 0 | 0 | 0 | 0.26 | 0.26 | 0.26 | 0.26 | 0.26 | 0.5 | 0.52 | 0.52 |

TABLE 2

Tensile, Thermal Conductivity and Hardness Results

| | | Tensile | | | Hardness | |
|---|---|---|---|---|---|---|
| Sample # | Cure Time at RT (days) | Peak Stress PSI | Peak Strain % | Thermal Conductivity W/mK | Shore A | Shore OO |
| 1 | 6 | 187 | 19 | 1.7 | 64 | 88 |
| 2 | 4 | 145 | 11 | 1.8 | 67 | 94 |
| 3 | 4 | 167 | 13 | 1.8 | 65 | 91 |
| 4 | 2 | n/a | n/a | 1.8 | 59 | 94 |
| 5 | 2 | 285 | 18 | 1.7 | 50 | 89 |
| 6 | 2 | 178 | 42 | n/a | n/a | n/a |
| 7 | 2 | 175 | 66 | n/a | n/a | n/a |
| 8 | 2 | 117 | 40 | n/a | n/a | n/a |
| 9 | 2 | 103 | 48 | n/a | n/a | n/a |
| 10 | 2 | too soft & weak to measure | | n/a | n/a | n/a |
| 11 | 4 | 187 | 79 | 1.7 | 68.5 | 93 |
| 11 | 11 | 253 | 60 | n/a | 74 | 94 |
| 12 | 4 | 126 | 56 | 1.8 | 73 | 94 |
| 12 | 11 | n/a | n/a | n/a | 81 | 95 |

In Table 2, n/a means not measured.

TABLE 3

Lap Shear Test Results

| Sample | Cure Time (days) | Substrate | Peak Stress PSI |
|---|---|---|---|
| 1 | 6 | FR-4 | 107.6 |
|   |   | PBT | 61.4 |
|   |   | Aluminum | 83.9 |
|   |   | Ni/Al | 61.1 |
| 1 | 16 | FR-4 | 104.2 |
|   |   | PBT | 64.5 |
|   |   | Aluminum | 81.7 |
|   |   | Ni/Al | 65.7 |
| 4 | 2 | FR-4 | 57.8 |
|   |   | PBT | 46.8 |
|   |   | Aluminum | 75.6 |
|   |   | Ni/Al | 50.5 |
| 5 | 2 | FR-4 | 172.0 |
|   |   | PBT | 54.8 |
|   |   | Aluminum | 116.7 |
|   |   | Ni/Al | 53.5 |
| 6 | 2 | FR-4 | 189.0 |
|   |   | PBT | 63.9 |
|   |   | Aluminum | 104.0 |
|   |   | Ni/Al | 93.8 |
| 7 | 2 | FR-4 | 175.2 |
|   |   | PBT | 80.2 |
|   |   | Aluminum | 108.5 |
|   |   | Ni/Al | 95.8 |
| 8 | 2 | FR-4 | 165.3 |
|   | 2 | PBT | 86.3 |
|   | 4.5 | Aluminum | 113.8 |
| 8 | 2 | Ni/Al | no results, weak |
| 9 | 2 | FR-4 | 172.0 |
|   | 2 | PBT | 85.2 |
|   | 4.5 | Aluminum | 107.7 |
|   | 2 | Ni/Al | no results, weak |
| 10 | 2 | FR-4 | 157.5 |
|   | 2 | PBT | 127.7 |
|   | 4.5 | Aluminum | 105.8 |
|   | 4.5 | Ni/Al | 76.9 |
| 11 | 4 | FR-4 | 170.3 |
|   |   | PBT | 51.1 |
|   |   | Aluminum | 137.6 |
|   |   | Ni/Al | 74.6 |
| 11 | 11 | FR-4 | 206.8 |
|   |   | PBT | 57.2 |
|   |   | Aluminum | 148 |
|   |   | Ni/Al | 92 |
| 12 | 4 | FR-4 | 182.2 |
|   |   | PBT | 52.0 |
|   |   | Aluminum | 89.0 |
|   |   | Ni/Al | 59.0 |
| 12 | 11 | FR-4 | 230.2 |
|   |   | PBT | 53.2 |
|   |   | Aluminum | 95.0 |
|   |   | Ni/Al | 84.3 |

The invention claimed is:

1. A curable composition comprising:

(A) a condensation reaction catalyst, (B) a polyorganosiloxane having an average, per molecule, of at least two hydrolyzable substituents, (C) a crosslinker having formula $(R^1_2R^2SiO_{1/2})_f$ $(R^1R^2SiO_{2/2})_g(R^2SiO_{3/2})_h(R^1_3SiO_{1/2})_i(R^1_2SiO_{2/2})_j$ $(R^1SiO_{3/2})_k(SiO_{4/2})_l$, where each $R^1$ is independently a monovalent organic group, each $R^2$ has formula

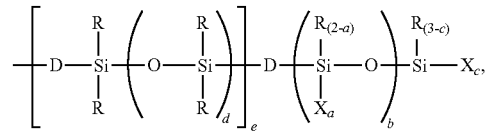

where each D is independently a divalent organic group, each R is independently a monovalent hydrocarbon group, each X is independently a hydrolyzable substituent, subscript a is 0, 1, or 2, subscript b≥0, subscript c is 0, 1, 2, or 3, with the proviso that a quantity (a+c)≥1; and subscript d≥1, subscript e is 0 or 1, subscript f≥0, subscript g≥0, subscript h≥0, with the proviso that a quantity (f+g+h)≥2, subscript i≥0, subscript j≥0, subscript k≥0, subscript l≥0, with the proviso that a quantity (g+j)≥2, and with the proviso that when a quantity (a+c)=1, then a quantity (f+g+h)≥3, and (D) a thermally conductive filler, where ingredient (D) is present in an amount of from 30% to 80% by volume of the curable composition.

2. The curable composition of claim 1, where at least one of the following conditions is satisfied:

(i) ingredient (A) comprises an organotin compound, or (ii) ingredient (A) comprises a dimethyltin compound.

3. The curable composition of claim 1, where at least one of the following conditions is satisfied:

(i) ingredient (B) comprises a silanol-functional polyorganosiloxane; or (ii) ingredient (B) comprises a silanol-terminated polydiorganosiloxane of formula $R^4R^3_2SiO—(R^3_2SiO)_p—SiR^3_2R^4$, where each $R^3$ is independently a monovalent hydrocarbon group or a monovalent halogenated hydrocarbon group, each $R^4$ is a hydrolyzable substituent, and subscript p has an average value of 50 to 200,000; or (iii) ingredient (B) comprises a silanol-terminated polydimethylsiloxane.

4. The curable composition of claim 1, where at least one of the following conditions is satisfied:

(i) ingredient (C) comprises a crosslinker of formula (i)

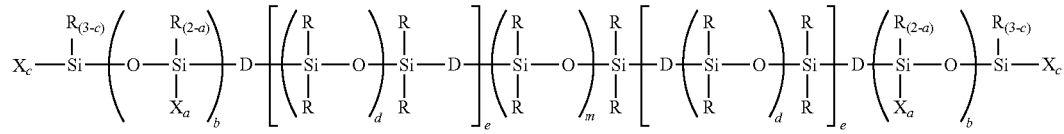

where each D is independently a divalent hydrocarbon group, each X is independently a hydrolyzable substituent, each subscript a is independently 0, 1, or 2, each subscript b≥0, each subscript c is independently 0, 1, 2, or 3, each subscript d≥1, each subscript e is independently is 0 or 1, with the proviso that subscripts a, b, and c are selected such that the crosslinker has an average, per molecule, of at least three X, and subscript m has an average value of at least 100; or (ii) ingredient (C) comprises a crosslinker of formula (ii)

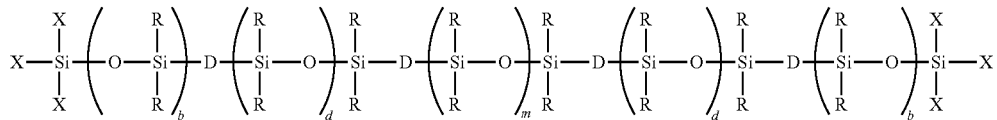

where each D is independently an alkylene group, each X is independently an alkoxy group, each subscript b≥0, each subscript 2≥d≥1, and subscript m has an average value of 150 to 500; or (iii) ingredient (C) comprises an alkoxysilylhydrocarbylene functional polyorganosiloxane.

5. The curable composition of claim 1, where the curable composition further comprises at least one additional ingredient selected from (E) a spacer, (F) a pigment, (G) a treating agent, (H) an adhesion promoter, or (J) a drying agent.

6. A method comprising (i) mixing ingredients comprising:

(A) a condensation reaction catalyst, (B) a polyorganosiloxane having an average, per molecule, of at least two hydrolyzable substituents, (C) a crosslinker having unit formula $(R^1{}_2R^2SiO_{1/2})_f$ $(R^1R^2SiO_{2/2})_g(R^2SiO_{3/2})_h(R^1{}_3SiO_{1/2})_i(R^1{}_2SiO_{2/2})_j$ $(R^1SiO_{3/2})_k(SiO_{4/2})_l$, where each $R^1$ is independently a monovalent organic group, each $R^2$ has formula

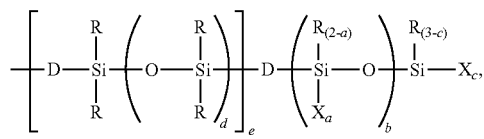

where each D is independently a divalent organic group, each R is independently a monovalent hydrocarbon group, each X is independently a hydrolyzable substituent, subscript a is 0, 1, or 2, subscript b≥0, subscript c is 0, 1, 2, or 3, with the proviso that a quantity (a+c)≥1; subscript d≥1, subscript e is 0 or 1, subscript f≥0, subscript g≥0, subscript h≥0, with the proviso that a quantity (f+g+h)≥2, subscript i≥0, subscript j≥0, subscript k≥0, subscript l≥0, with the proviso that a quantity (g+j)≥2, and with the proviso that when a quantity (a+c)=1, then a quantity (f+g+h)≥3, and (D) a thermally conductive filler;

thereby preparing a curable composition; where ingredient (D) is present in an amount of from 30% to 80% by volume of the curable composition.

7. The method of claim 6, where the method further comprises adding to the curable composition at least one additional ingredient selected from (E) a spacer, (F) a pigment, (G) a treating agent, (H) an adhesion promoter, or (J) a drying agent.

8. The method of claim 6, further comprising: (ii) contacting the curable composition with water.

9. A thermally conductive reaction product prepared by the method of claim 8.

10. The curable composition of claim 1, where ingredient (D) comprises alumina.

11. The curable composition of claim 2, where condition (ii) is satisfied: ingredient (A) comprises a dimethyltin compound.

12. The curable composition of claim 4, where condition (ii) is satisfied: ingredient (C) comprises a crosslinker of formula (ii)

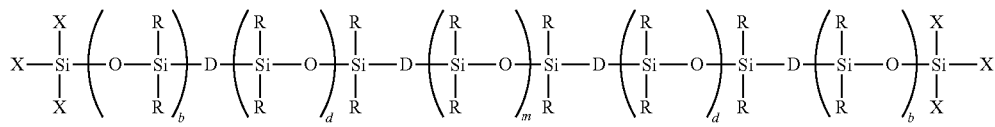

where each D is independently an alkylene group, each X is independently an alkoxy group, each subscript b≥0, each subscript 2≥d≥1, and subscript m has an average value of 150 to 500.

13. The curable composition of claim 5, where the curable composition further comprises (H) the adhesion promoter.

14. The method of claim 6, where ingredient (D) comprises alumina.

15. The method of claim 7, further comprising: (ii) contacting the curable composition with water.

16. A thermally conductive reaction product prepared by the method of claim 15.

17. The curable composition of claim 5, where the curable composition is stored under substantially anhydrous conditions, alternatively is stored in a sealed container.

18. The method of claim 6, further comprising: (i-b) sealing the curable composition in a container to prevent exposure to moisture.

* * * * *